US009730096B2

(12) United States Patent
Boyd et al.

(10) Patent No.: US 9,730,096 B2
(45) Date of Patent: *Aug. 8, 2017

(54) NETWORK PERFORMANCE TESTING IN NON-HOMOGENEOUS NETWORKS

(71) Applicant: International Business Machines Corporation, Armonk, NY (US)

(72) Inventors: William T. Boyd, Poughkeepsie, NY (US); Georgy A. Chochia, Poughkeepsie, NY (US); Donald G. Grice, New Paltz, NY (US); John Lewars, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,861

(22) Filed: Aug. 6, 2015

(65) Prior Publication Data
US 2016/0182346 A1 Jun. 23, 2016

Related U.S. Application Data

(63) Continuation of application No. 14/578,581, filed on Dec. 22, 2014.

(51) Int. Cl.
*H04W 24/08* (2009.01)
*H04L 12/24* (2006.01)
(Continued)

(52) U.S. Cl.
CPC ............ *H04W 24/08* (2013.01); *H04L 41/12* (2013.01); *H04L 43/06* (2013.01); *H04W 24/10* (2013.01);
(Continued)

(58) Field of Classification Search
CPC ...... H04W 24/08; H04W 24/10; H04L 43/045
See application file for complete search history.

(56) References Cited

U.S. PATENT DOCUMENTS 5,936,963 A * 8/1999 Saussy ................. H04L 12/413
370/447
8,055,879 B2 11/2011 Archer et al.
(Continued)

FOREIGN PATENT DOCUMENTS

EP 1469636 A2 10/2004
GB WO 2015028774 A1 * 3/2015 ............. H04L 45/70

OTHER PUBLICATIONS

Disclosed Anonymously, "A method for improving virtual machine (VM) performance based on increasing inter-node memory access of VMs", An IP.com Prior Art Database Technical Disclosure, IP.com No. IPCOM000202383D, Dec. 14, 2010., pp. 1-5.
(Continued)

*Primary Examiner* — Ricky Ngo
*Assistant Examiner* — Lan Huong Truong
(74) *Attorney, Agent, or Firm* — Steven F. McDaniel

(57) ABSTRACT

As disclosed herein, a method, executed by a computer, for analyzing a performance metric includes distributing link connection information for a network to each node in the network, pairing each node with another node in the network to provide paired nodes, testing a performance metric for the paired nodes, and generating a performance report for the network. The method may further include receiving link connection information for the network. The method may further include constructing a connectivity graph based on the received link connection information. The method can be used to test link performance within non-homogeneous networks.

7 Claims, 6 Drawing Sheets

(51) Int. Cl.
*H04W 24/10* (2009.01)
*H04L 12/26* (2006.01)

(52) U.S. Cl.
CPC ...... *H04L 43/0852* (2013.01); *H04L 43/0894* (2013.01); *H04L 43/103* (2013.01)

(56) References Cited

U.S. PATENT DOCUMENTS

| | | | |
|---|---|---|---|
| 2010/0322141 A1* | 12/2010 | Liu | H04W 24/10 370/315 |
| 2011/0125925 A1* | 5/2011 | Bouthemy | H04L 12/2834 709/250 |
| 2011/0267073 A1 | 11/2011 | Chengson et al. | |
| 2012/0047305 A1 | 2/2012 | Drottar et al. | |
| 2013/0111038 A1* | 5/2013 | Girard | H04L 69/16 709/226 |
| 2013/0311643 A1* | 11/2013 | Kulkarni | H04L 43/0852 709/224 |
| 2015/0023174 A1 | 1/2015 | Dasgupta et al. | |
| 2015/0074264 A1* | 3/2015 | Izhak-Ratzin | G06F 17/30194 709/224 |
| 2015/0163108 A1* | 6/2015 | Wong | H04L 41/12 709/224 |
| 2016/0021189 A1* | 1/2016 | Kumar | H04L 67/12 709/231 |

OTHER PUBLICATIONS

Madsen et al., "Connectivity Probability of Wireless Ad Hoc Networks: Definition, Evaluation, Comparison", © 2005 Kluwer Academic Publishers, Apr. 13, 2005, pp. 1-22.

Mickens et al., "Analytical Models for Epidemics in Mobile Networks", IEEE Computer Society, Third IEEE International Conference on Wireless and Mobile Computing, Networking and Communications (WiMob 2007), © 2007 IEEE, pp. 1-7.

Boyd et al., "Network Performance Testing in Non-Homogeneous Networks", U.S. Appl. No. 14/578,581, filed Dec. 22, 2014, pp. 1-29.

IBM Appendix P, list of IBM patents or patent applications treated as related, Aug. 6, 2015.

* cited by examiner

NETWORK PERFORMANCE TESTING IN NON-HOMOGENEOUS NETWORKS

BACKGROUND OF THE INVENTION

The present invention relates generally to the field of network performance, and more particularly to testing link performance within a non-homogeneous network.

Given all of the critical tasks computer networks are relied upon to handle, the ability to efficiently and effectively test these networks is an important function. As networking needs continue to increase, network connections in computing environments are becoming increasingly complicated and non-homogeneous. Existing network testing methods for analyzing network performance metrics include standard benchmark suites such as the Intel MPI Benchmark. These methods do not attempt to characterize link performance in the framework of a non-homogeneous networking environment.

SUMMARY

As disclosed herein, a method, executed by a computer, for analyzing a performance metric includes distributing link connection information to each node in a network, pairing each node with another node in the network to provide paired nodes, testing a performance metric for the paired nodes, and generating a performance report for the network. The method may further include receiving the link connection information for the network. The method may further include constructing a connectivity graph based on the received link connection information. The method can be used to test link performance within non-homogeneous networks.

DETAILED DESCRIPTION

Figure 1A:
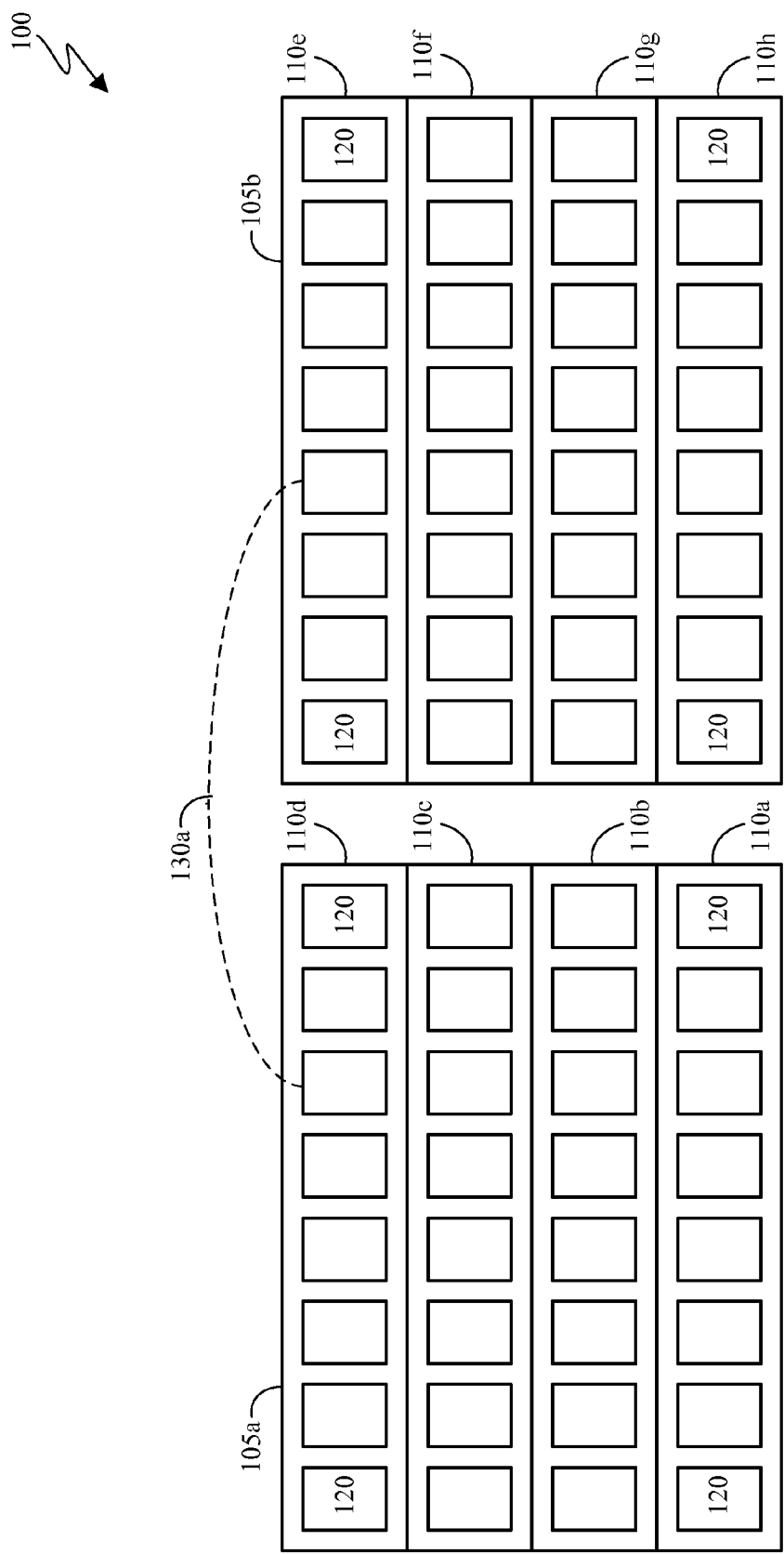
FIGS. 1A-1C are functional block diagrams illustrating a network system environment in accordance with an embodiment of the present invention.
Figure 1B:
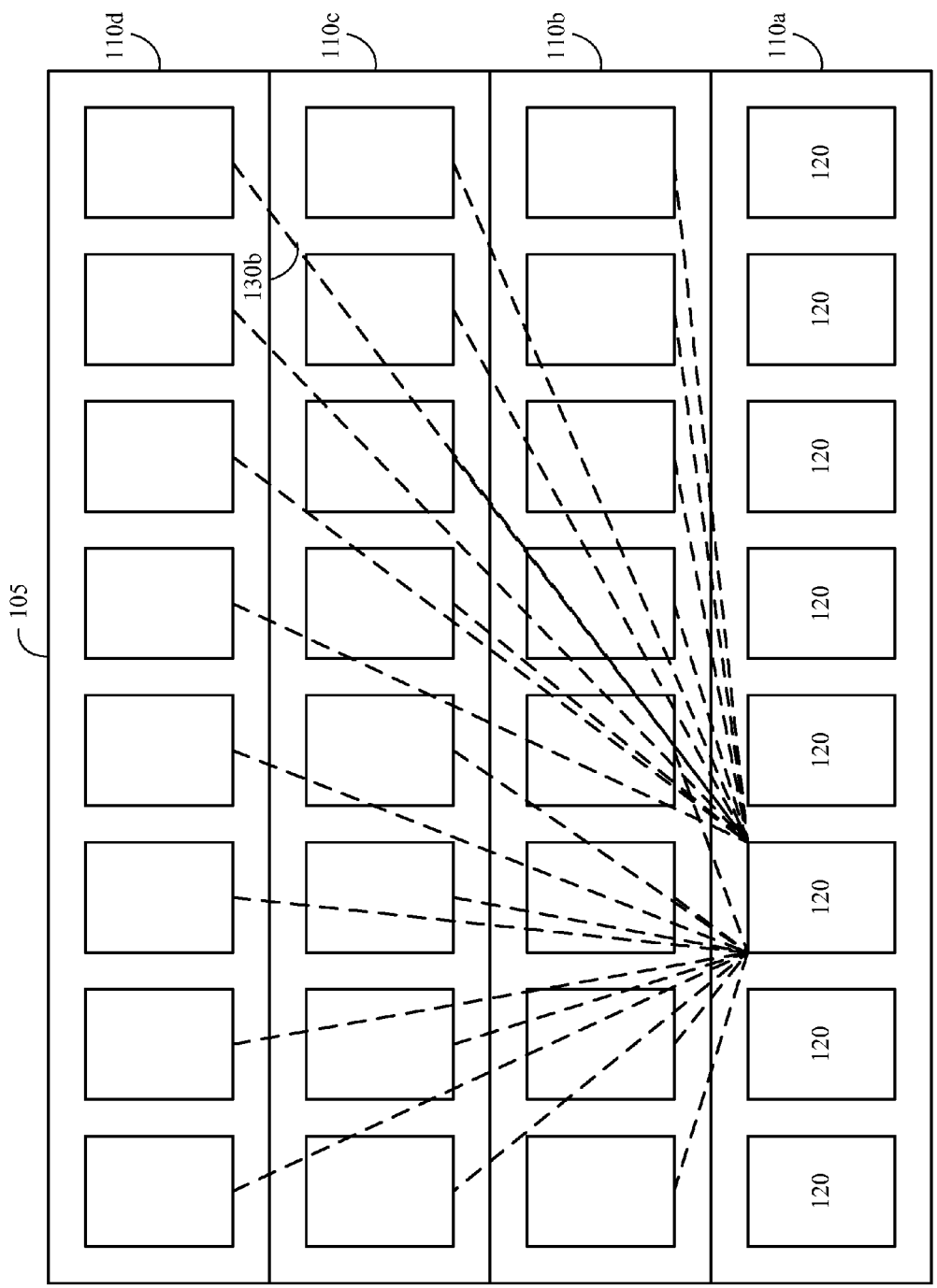
Figure 1C:
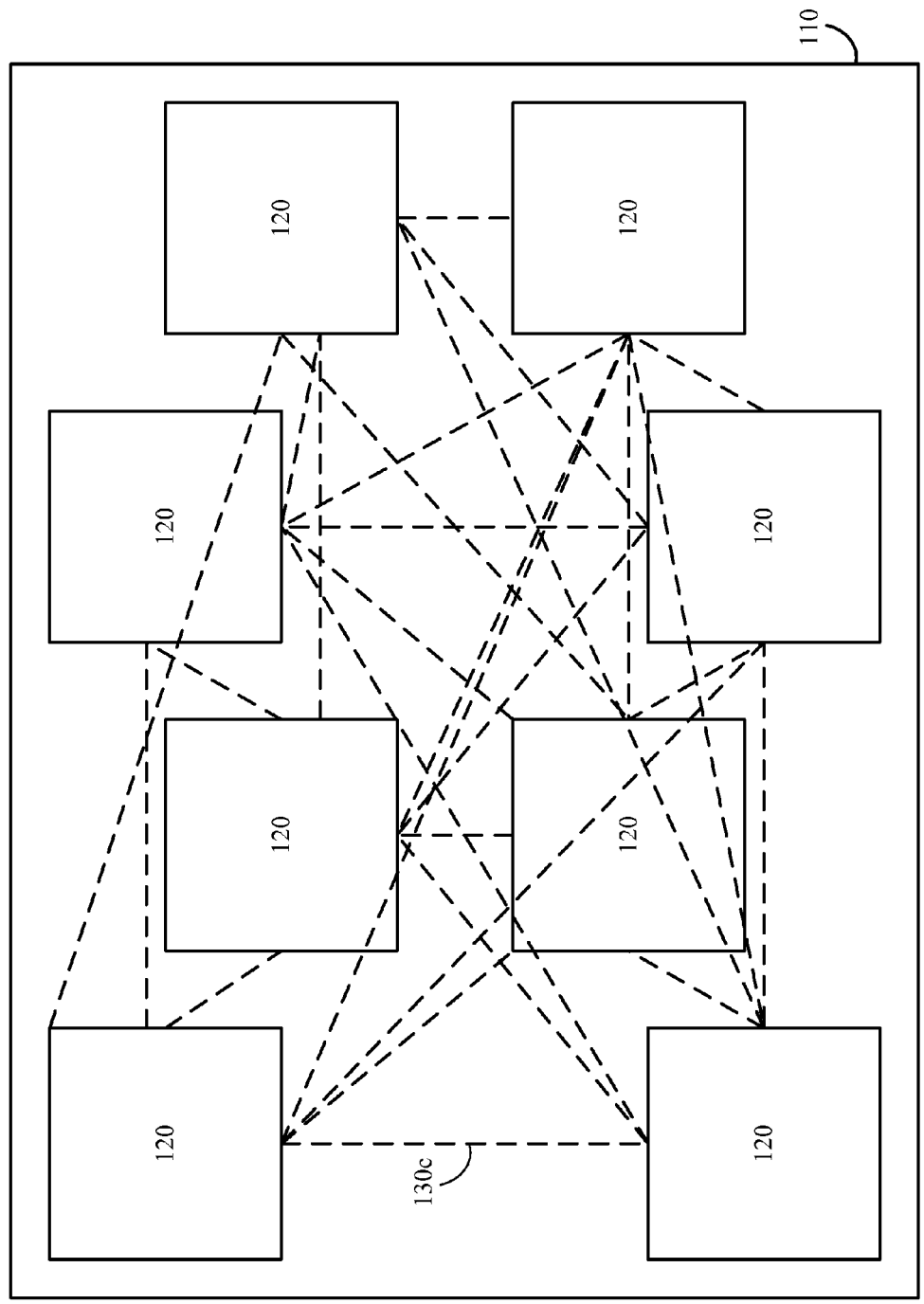

FIGS. 1A-1C are functional block diagrams illustrating a computing server 100 in accordance with an embodiment of the present invention. The depicted computer server 100 is an example of a networking environment which may be tested using the network performance testing method disclosed herein.

FIG. 1A is a functional block diagram depicting a part of a computing server 100 comprising two supernodes 105. A computing server can comprise a plurality of supernodes, but two are sufficient to illustrate connections across supernodes. As depicted, each supernode 105 consists of four drawers 110, and each drawer 110 contains eight nodes 120. As used herein, the term 'node' refers to a contained set of memory/CPU and network interface resources. The dotted line in FIG. 1A, labeled 130a, represents a link between a node in supernode 105a and a node in supernode 105b. Links between nodes in different supernodes may be referred to as D-links.

FIG. 1B is a functional block diagram depicting a supernode 105 within a computing server 100. The supernode contains four drawers 110, with each drawer containing eight nodes 120. The dotted lines in FIG. 1B, labeled 130b, represent links between a node 120 in one drawer 110a and a node 120 in another drawer 110b, 110c, or 110d. These links connect two nodes within the same supernode but not within the same drawer. Links between nodes in different drawers within the same supernode may be referred to as L-Remote links.

FIG. 1C is a functional block diagram of a drawer 110 within a supernode 105. The drawer contains eight nodes 120. The dotted lines in FIG. 1C, labeled 130c, represent links between nodes within the same drawer. As depicted, each node in the drawer is connected to all of the other nodes in the same drawer. Links between nodes in the same drawer may be referred to as L-Local links.

The computing server 100 represents a system comprising non-homogeneous connections. The previously mentioned L-Local links, L-Remote links, and D-links are all connections with different characteristics that will lead to different latency and bandwidth characteristics. Additionally, each pair of nodes may not have a dedicated D-link between them, so these potentially highly shared D-links can be particularly difficult to test due to contention from multiple node pairs trying to test simultaneously. The method disclosed herein eliminates link contention using an algorithm for variable delays. Link contention is a concern in any non-homogeneous system where links can potentially be shared, so the method is applicable for testing systems beyond the depicted computing server 100.

Figure 2:
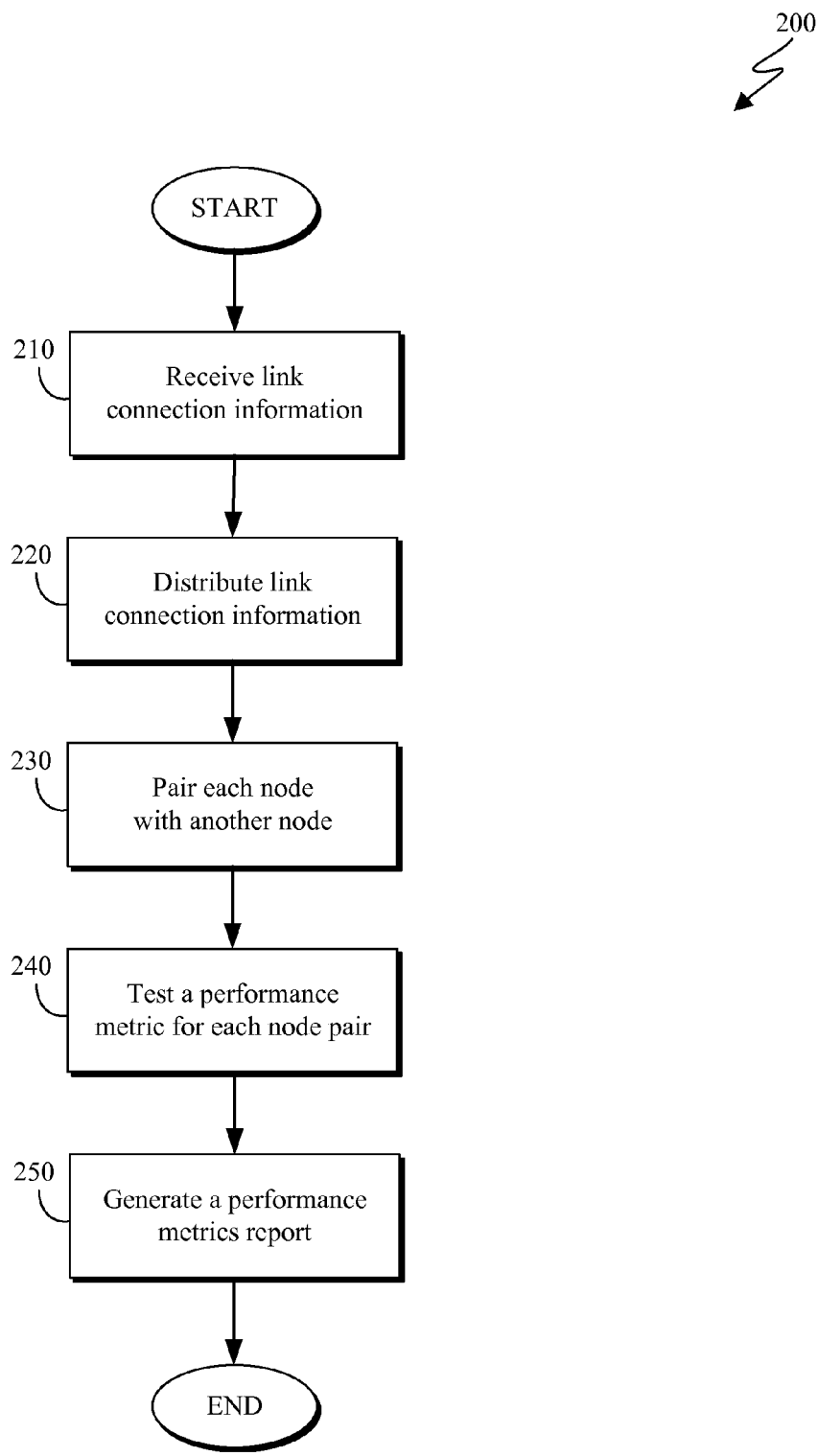
FIG. 2 is a flowchart depicting a network performance testing method in accordance with an embodiment of the present invention.

FIG. 2 is a flowchart depicting a network performance testing method 200 in accordance with an embodiment of the present invention. As depicted, the method includes receiving (210) link connection information, distributing (220) the link connection information to each node in the network, iterations of pairing (230) each node with another node in the network followed by testing (240) a performance metric for each pair of nodes, and generating (250) a performance report for the network. The method can be used to test link performance within non-homogeneous networks.

Receiving (210) link connection information may include receiving information regarding how the nodes within the network are connected. This link connection information could come in the form of endpoint ID's for each link, which would identify which nodes are connected by the link. In some embodiments, the link connection information also comprises information regarding what types of links connect the nodes. For example, in the case of the computing server in FIGS. 1A-1C, the link connection information could include whether each link is an L-Local link, an L-Remote link, or a D-link. In some embodiments, in conjunction with receiving link connection information a connectivity graph is constructed to reflect the link connection information. The connectivity graph may show which nodes are connected to each other and via what kind of link.

Distributing (220) the link connection information to each node in the network may include sending the link connection information to each individual node in the network. Once each node has the link connection information, each node has information regarding which nodes in the network it is connected to via which links. From here, the nodes can be paired for the link performance testing steps. In the case where a connectivity graph has been constructed, the connectivity graph may be distributed to each individual node in the network.

Pairing (230) each node with another node in the network may include selecting nodes to be paired together for testing. Once the nodes are paired, connection performance tests may be conducted on the link connecting each pair of nodes. Pairing may occur multiple times (in other words, a series of pairings can be iterated through, allowing for the testing of all possible pairs), as each node will end up being paired with all the other nodes it may be connected to. This method of pairing each node with every other node ensures a comprehensive test of all the links within the network.

Figure 3:
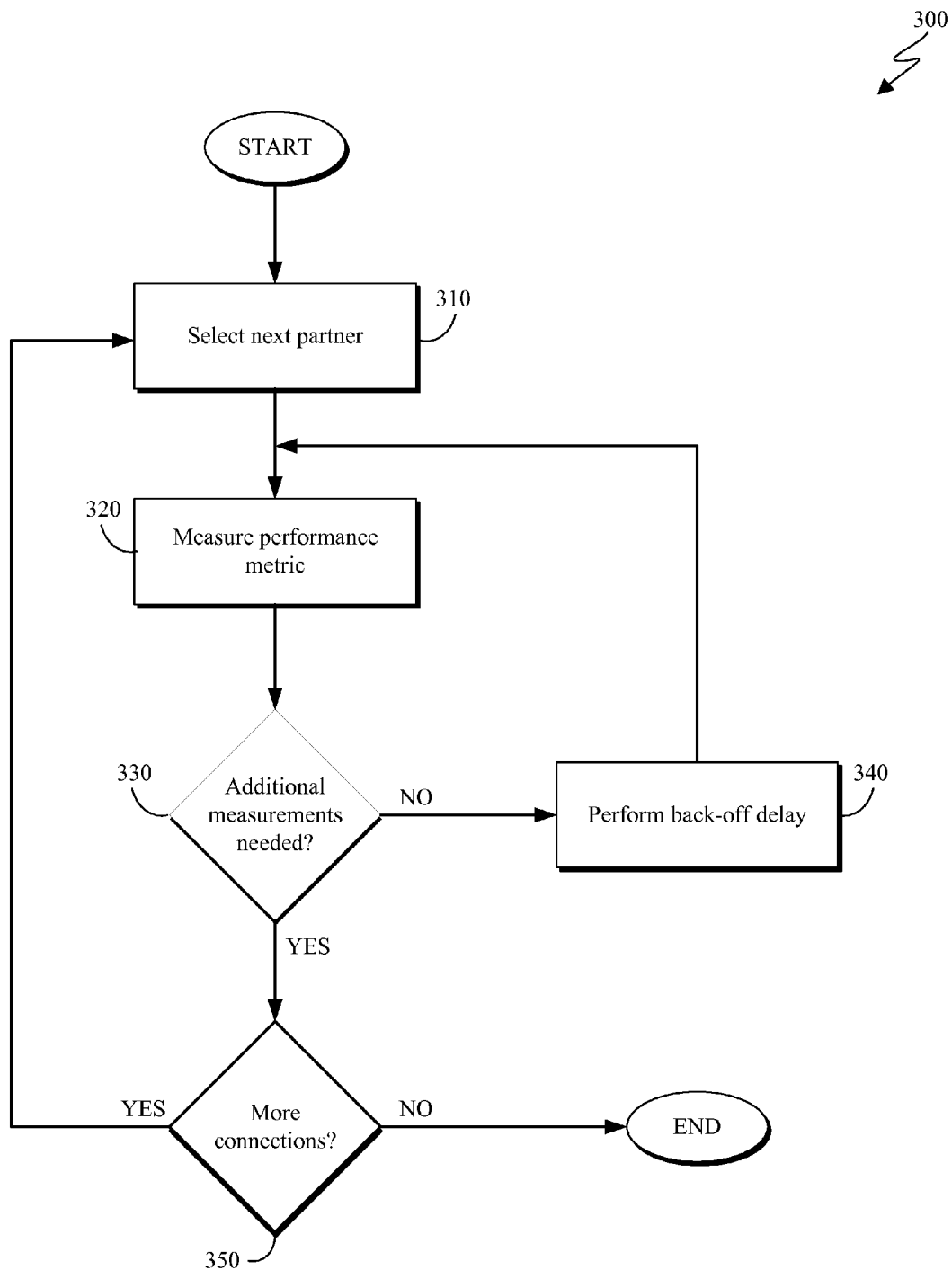
FIG. 3 is a flow diagram depicting a link testing method in accordance with an embodiment of the present invention.

Testing (240) a performance metric for each pair of nodes may include testing characteristics that may impact the performance of each connection between two paired nodes. The performance metric may be tested for all possible pairs of nodes within the system. FIG. 3 depicts additional details for one example of the testing operation 240. In some embodiments, once the initial pairs of nodes are tested, the process returns to the pairing step 230 such that each node may be re-paired with a different node and the new node pairs may be tested to ensure a comprehensive test of the links in the network.

Generating (250) a performance report for the network may include compiling the performance metric measurements for each link. These performance metric measurements may all be presented to a user in the form of a dataset. In one embodiment, the performance report comprises information for only links that have been deemed inadequate based on the performance measurements. This report may be consumed by a user or a system such that the links that have been identified as operating below performance standards can be addressed.

FIG. 3 is a flow diagram depicting operational steps of a link testing method 300 for a network in accordance with an embodiment of the present invention. As depicted, the method includes selecting (310) a partner for each node, measuring (320) the performance metric across the link connecting the two nodes, determining (330) if additional measurements need to be taken, performing (340) back-off delay and re-measuring the performance metric if the initial measurement was insufficient, and determining (350) if there are more node pairs to be tested. The link testing method 300 ensures a comprehensive test is conducted for all of the connections within a network.

Selecting (310) a partner for each node may include pairing a node with another node. This pairing is executed to isolate a particular link to be tested, namely the link connecting the paired nodes. The pairing step is repeated each time the testing of a node pair is finished and the two previously paired nodes need to be paired with different nodes to isolate a different link for testing. In some embodiments, the nodes may be paired to test the links in a specific order to facilitate more efficient testing. For example, in the case of the computing server 100 in FIGS. 1A-1C, all the L-Local links may be tested first, followed by the L-Remote links and then the D-links.

Measuring (320) the performance metric across the link connecting the paired nodes may include using standard bandwidth or latency measuring methods to test the performance of the link. For example, a typical approach to performing a bandwidth measurement is to transfer a 'large' file, or the contents of a region of allocated memory, from one node to another node and measure the time required to complete the transfer or copy of the file. The bandwidth is then calculated by dividing the file size by the duration of the transfer to get the throughput in megabits, kilobits, or bits per second. Similarly, latency may be measured using standard latency measuring methods. These performance measurements may be recorded to be viewed or analyzed.

Determining (330) if additional measurements need to be taken may include comparing the measured performance metric for a link to a minimum acceptable value. For example, this minimum acceptable value for a bandwidth may represent the smallest bandwidth that can handle the dataflow the network is likely to encounter, and may be a preset value. In some embodiments, different kinds of links (such as L-Remote links and L-Local links in the case of the computing server 100) may have different benchmark values they need to meet. If the performance metric for the link is sufficient, the method continues to determining (350) if there are more node pairs to be tested. If the performance metric for the link is insufficient, the method continues to performing (340) back-off delay. Determining if additional measurements need to be taken may also include determining if a link has been tested a predetermined maximum number of times. A maximum may be set to a value "X" such that if a link's performance has been measured X times and yielded inadequate measurements each time, the paired nodes that the link connects will stop initiating tests and the link will be reported as failed.

Performing (340) back-off delay and re-measuring the performance metric if the initial measurement was insufficient may include implementing variable delays using an exponential back-off algorithm to stagger the occurrences of the performance metric tests. Exponential back-off is an algorithm that uses feedback to multiplicatively decrease the rate of some process, in order to gradually find an acceptable rate. Exponential back-off is executed to determine the amount of time each pair of nodes will delay before they are tested again. In one embodiment, the algorithm may be directly related to the number of times a link has been tested. The more times a link has been tested, the longer the delay will be before another test is initiated. In some embodiments, a random element may be introduced to the algorithm to ensure the delay times are staggered to minimize the number of links being tested simultaneously. After the back-off delay has been performed, the depicted method returns to the measuring operation 320, and continues until an acceptable performance metric is met. Once an acceptable performance metric is met, the pair of nodes no longer initiates tests and the method continues to determining (350) if there are more node pairs to be tested.

Determining (350) if there are more node pairs to be tested occurs after a node pair has completed testing and the performance metric across the pair has exceeded the minimum acceptable value. Determining if there are more node pairs to be tested may include identifying if there are any nodes that the two paired nodes have yet to be paired with for testing. If there are more node pairs to be tested, the method loops back to the selecting operation 310. If there are no more node pairs to be tested, the testing method 300 ends.

Figure 4:
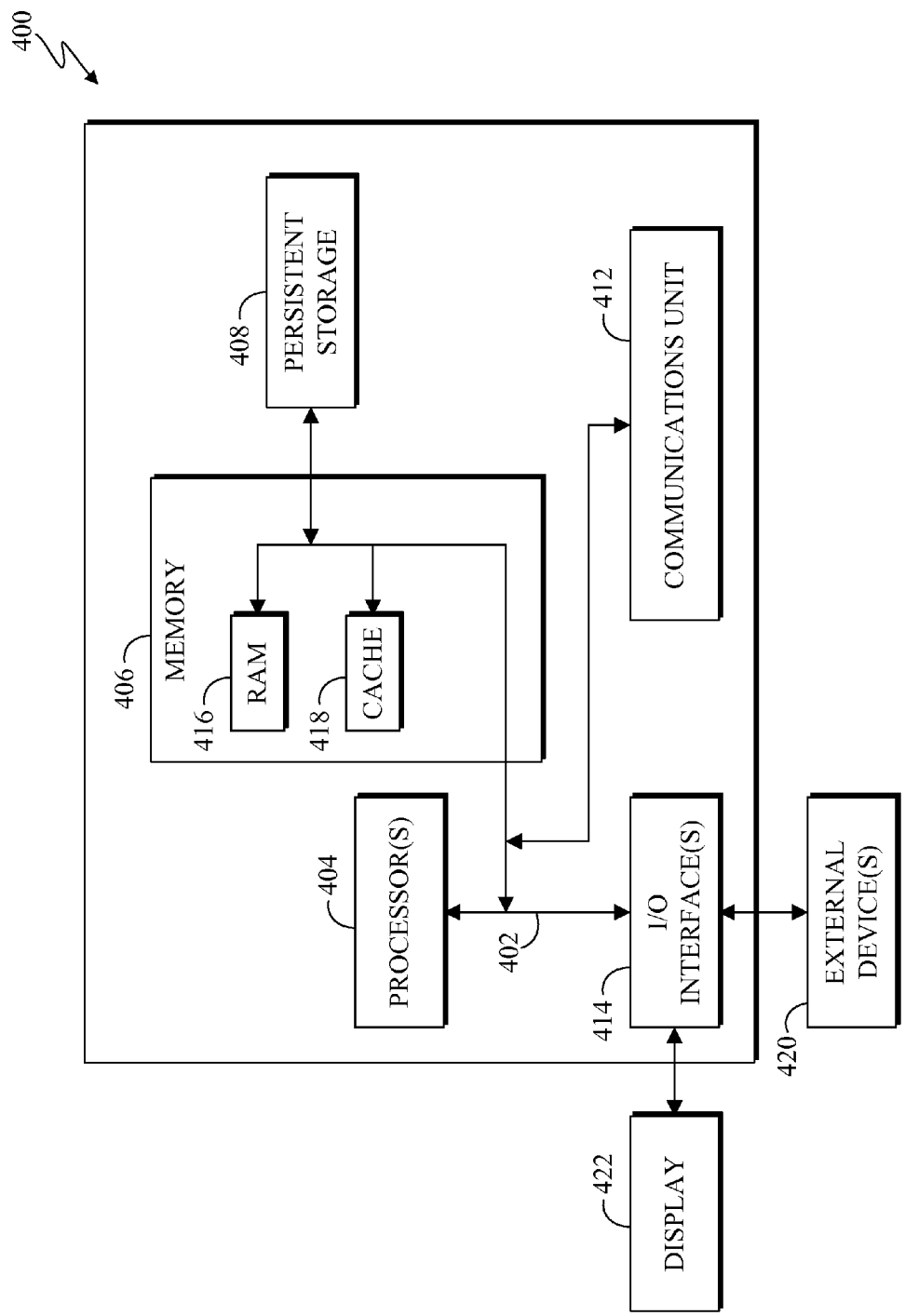
FIG. 4 is a block diagram depicting one example of a computing apparatus (i.e., computer) suitable for executing the methods disclosed herein.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, executed by a computer, the method comprising:
   distributing link connection information for a network to each node in the network;
   pairing each node with another node in the network to provide paired nodes;
   testing a performance metric for the paired nodes according to an exponential back-off algorithm, wherein the exponential back off algorithm delays the occurrence of performance metric tests between pairs of nodes;
   determining whether an acceptable performance metric measurement has occurred for a pair of nodes;
   responsive to determining an acceptable performance metric measurement has occurred, halting performance metric tests between the pair of nodes;
   generating a performance report for the network; and
   adjusting one or more connections between one or more pairs of nodes according to the generated performance report.

2. The method of claim 1, further comprising receiving the link connection information for the network.

3. The method of claim 2, further comprising constructing a connectivity graph based on the link connection information.

4. The method of claim 3, wherein the connectivity graph specifies which nodes in the network are connected by a link and what type of link connects them.

5. The method of claim 1, wherein the performance report comprises information regarding the tested performance metric for the paired nodes in the network.

6. The method of claim 1, wherein the performance metric comprises bandwidth or latency.

7. The method of claim 1, further comprising re-pairing each node with a different node to provide new paired nodes and testing the performance metric for the new paired nodes.

* * * * *